(12) United States Patent
Hiro et al.

(10) Patent No.: US 8,591,684 B2
(45) Date of Patent: Nov. 26, 2013

(54) SPIRAL REVERSE OSMOSIS MEMBRANE ELEMENT, METHOD OF MANUFACTURING THE SAME, AND ITS USE METHOD

(75) Inventors: Atsushi Hiro, Ibaraki (JP); Hiroki Fujioka, Ibaraki (JP); Atsuhito Koumoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 1101 days.

(21) Appl. No.: 12/173,694

(22) Filed: Jul. 15, 2008

(65) Prior Publication Data

US 2008/0295951 A1 Dec. 4, 2008

Related U.S. Application Data

(62) Division of application No. 11/216,051, filed on Sep. 1, 2005.

(30) Foreign Application Priority Data

Sep. 2, 2004 (JP) ............................ P. 2004-255779

(51) Int. Cl.
*B32B 37/00* (2006.01)

(52) U.S. Cl.
USPC ........................................... 156/184

(58) Field of Classification Search
USPC ........................................... 156/184
See application file for complete search history.

(56) References Cited

U.S. PATENT DOCUMENTS

| | | | |
|---|---|---|---|
| 4,137,113 A * | 1/1979 | Kanamaru et al. | 156/187 |
| 4,464,494 A * | 8/1984 | King et al. | 523/400 |
| 4,582,726 A * | 4/1986 | Shuey et al. | 427/208.8 |
| 6,709,590 B1 * | 3/2004 | Hirose | 210/500.38 |
| 6,821,430 B2 * | 11/2004 | Andou et al. | 210/636 |
| 2003/0034116 A1 | 2/2003 | Simonetti | |

FOREIGN PATENT DOCUMENTS

| | | | |
|---|---|---|---|
| JP | 59-73008 A | | 4/1984 |
| JP | 6-71147 A | | 3/1994 |
| JP | 7-204471 A | | 8/1995 |
| JP | 2000-342933 A | * | 12/2000 |

(Continued)

OTHER PUBLICATIONS

Machine translation of JP-2000-342933 available from JPO website, date unknown, 6 pages.*

(Continued)

*Primary Examiner* — Jeff Aftergut
(74) *Attorney, Agent, or Firm* — Sughrue Mion, PLLC (57) ABSTRACT

A spiral reverse osmosis membrane element that improves impregnation property of a sealing resin at edges of a membrane leaf and can effectively prevent micro-leaks, by using, for example, a porous support having a structure capable of sufficiently impregnating therein a sealing resin, a method for manufacturing the same, and a use method of the same are disclosed. The spiral reverse osmosis membrane element comprises a cylindrically wound body comprising a perforated core tube and, spirally wound therearound, a separation membrane, a feed-side passage material and a permeation-side passage material in a laminated state, and a sealing portion for preventing a feed-side liquid and a permeation-side liquid from being mixed together, wherein the separation membrane facing through the permeation-side passage material has a structure that a porous support and a skin layer are successively laminated on a non-woven fabric layer, and the sealing portion sealed with a sealing resin is provided at the edges of the separation membrane, wherein the separation membrane is impregnated with the sealing resin at least up to the vicinity of the skin layer through the porous support.

5 Claims, 3 Drawing Sheets

(56) References Cited

FOREIGN PATENT DOCUMENTS

| JP | 2001-198442 A | 7/2001 |
|----|---------------|--------|
| JP | 2001-252540 A | 9/2001 |
| JP | 2005-199141 A | 7/2005 |
| WO | 00/44481 A1 | 8/2000 |
| WO | 2004/000445 A1 | 12/2003 |

OTHER PUBLICATIONS

Japanese Office Action dated Nov. 7, 2008.
Extended European Search Report dated Aug. 1, 2011 issued by the European Patent Office in counterpart European Application No. 05 019 120.4.

* cited by examiner

SPIRAL REVERSE OSMOSIS MEMBRANE ELEMENT, METHOD OF MANUFACTURING THE SAME, AND ITS USE METHOD

CROSS-REFERENCE TO RELATED APPLICATIONS

This is a Divisional of application Ser. No. 11/216,051 filed Sep. 1, 2005. The entire disclosure of the prior application, application Ser. No. 11/216,051 is considered part of the disclosure of the accompanying divisional application and is hereby incorporated by reference.

FIELD OF THE INVENTION

The present invention relates to a spiral reverse osmosis membrane element that separates components floating or dissolving in a liquid, and a method of manufacturing the same. More particularly, the present invention relates to a spiral reverse osmosis membrane element that can reduce micro-leaks in forming a sealing portion for preventing a feed-side fluid and a permeation-side from being mixed together, using an adhesive, and a method of manufacturing the same.

BACKGROUND ART

Conventionally, for example, a spiral membrane element comprising a porous core tube and, spirally wound therearound, a unit comprising a feed-side passage material guiding a feed-side fluid to a surface of a separation membrane, the separation membrane separating the feed-side fluid, and a permeation-side passage material guiding to the core tube a permeation-side fluid separated from the feed-side fluid by permeating through the separation membrane has been known as a fluid separation element used in reverse osmosis, ultrafiltration, microfiltration or the like.

Such a spiral membrane element is usually manufactured by alternately piling up a feed-side passage material held between two halves of a folded separation membrane and a permeation-side passage material, applying an adhesive to edges (three sides) of the separation membrane in order to form a sealing portion for preventing a feed-side fluid and a permeation-side fluid from being mixed, thereby preparing a separation membrane unit, spirally winding one or more units thus prepared around a core tube, and sealing edges of the separation membrane.

Figure 5:
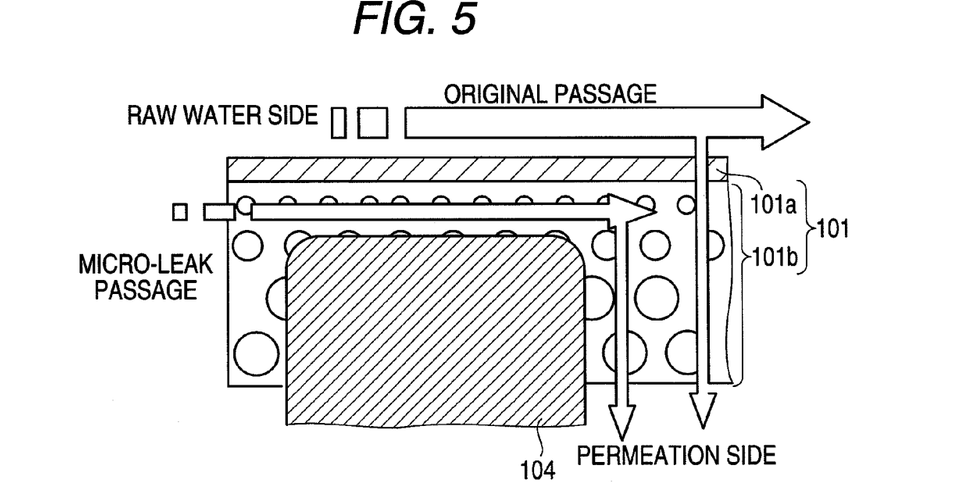
FIG. 5 is an explanatory view showing the state of microleaks in the conventional spiral reverse osmosis membrane element.

Regarding the sealing method, for example, JP-A-7-204471 discloses a method of adhering the edges of the separation membrane by sealing the edges thereof with a hot-melt type tape-form adhesive, prefixing the adhesive and irradiating the adhesive with electromagnetic wave. However, in this method, the adhesive does not sufficiently impregnate into the inside of the separation membrane, so that the permeation-side passage and the feed-side passage cannot completely be parted. As a result, raw water cannot sufficiently be prevented from flowing in the permeation side. Specifically, as shown in FIG. 5, a porous layer 101b remains on a portion in which impregnation of an adhesive 102 into a separation membrane 101 is insufficient, thereby part of the raw liquid to be flown along an outer surface of the separation membrane passes thought the porous layer 101b to flow in the inside of the separation membrane 101 in a horizontal direction, and then mixes in the permeation side.

There is a method of preventing raw water from being permeated by using a large amount of an adhesive. However, this method poses the problem that where an adhesive is used in an amount larger than is necessary, thickness of the adhesive is ununiform, resulting in the problem when winding a membrane leaf around a core tube such that wrinkles are easy to occur.

SUMMARY OF THE INVENTION

The present invention has been made in view of the above conventional problems.

Accordingly, one object of the present invention is to provide a spiral reverse osmosis membrane element that improves impregnation property of a sealing resin at edges of a membrane leaf and can effectively prevent micro-leaks, by using, for example, a non-woven fabric layer having a structure capable of sufficiently impregnating therein a sealing resin such as an adhesive.

Another object of the present invention is to provide a method of manufacturing the spiral reverse osmosis membrane element.

Still another object of the present invention is to provide a use method of the spiral reverse osmosis membrane element.

As a result of extensive investigations on a spiral reverse osmosis membrane element, its manufacturing method and its use method to overcome the conventional problems, it has been found that the above object can be achieved by employing the following constitutions.

The spiral reverse osmosis membrane element according to the present invention comprises a cylindrically wound body comprising a perforated core tube and, spirally wound therearound, a separation membrane, a feed-side passage material and a permeation-side passage material in a laminated state, and a sealing portion for preventing a feed-side liquid and a permeation-side liquid from being mixed together, wherein the separation membrane facing through the permeation-side passage material has a structure that a porous support and a skin layer are successively laminated on a non-woven fabric layer, and the sealing portion sealed with a sealing resin is provided at the edges of the separation membrane, wherein the separation membrane is impregnated with the sealing resin at least up to the vicinity of the skin layer through the porous support.

According to the above constitution, the sealing resin is present at least up to the vicinity of the skin layer. This improves sealing effect of the sealing portion, thereby effectively preventing micro-leaks of raw fluid from the feed-side passage to the permeation-side passage. As a result, attempt can be made to improve rejection of substances to be separated (for example, particles or salts), and improve separation performance as the spiral reverse osmosis membrane element.

Where NaCl aqueous solution having a concentration of 32,000 ppm as a feed-side fluid is supplied to the separation membrane under an operating pressure of 5.5 MPa, and recovery of permeate water is set to be 8-12%, it is preferable that electroconductivity of the permeate water in the vicinity of the sealing portion is 2 times or less that of the permeate water in the region other than the sealing portion.

According to the above constitution, where separation operation of NaCl aqueous solution is conducted under the above conditions, electroconductivity of the permeate water in the vicinity of the sealing portion is 2 times or less that of the permeate water in the region other than the sealing portion. Therefore, the constitution makes it possible to provide a spiral reverse osmosis membrane element capable of separating NaCl aqueous solution into NaCl and permeate water with good salt rejection.

The non-woven fabric has an average pore diameter of preferably 8-12 μm, and a ratio of maximum pore diameter to average pore diameter (maximum pore diameter/average pore diameter) of preferably 1:1 to 4:1.

When the non-woven fabric layer has the average pore diameter within the above range, the non-woven fabric layer is easily impregnated with the sealing resin, and the effect of capillary action can be made optimum. As a result, a separation membrane impregnated with the sealing resin at least up to the vicinity of the skin layer is obtained. Further, when the ratio of maximum pore diameter to average pore diameter is within a range of 1:1 to 4:1, impregnation property of the sealing resin on the surface of the non-woven fabric layer can be made uniform, whereby occurrence of unevenness can be reduced.

The non-woven fabric layer is impregnated with a polymer constituting the porous support, and the amount of the polymer impregnated is preferably 3-6 $g/m^2$.

When the polymer in the impregnation amount of 3-6 $g/m^2$ is contained in the skin layer side of the non-woven fabric layer as in the above constitution, impregnation of the sealing resin is accelerated by contacting the sealing resin with the polymer when the non-woven fabric is impregnated with the sealing resin. As a result, a separation membrane that has sufficiently been impregnated with the sealing resin is obtained.

The porous support has a thickness of preferably 30-60 μm.

The above constitution can reduce resistance of the sealing resin to impregnation, and also prevent increase of membrane deficiency.

Where the outer surface of the non-woven fabric layer, and the non-woven fabric layer comprise plural layers, it is preferable that a barrier portion disturbing impregnation of the sealing resin is not formed between the layers.

If the barrier portion disturbing impregnation of the sealing resin is present between the layers where the outer surface of the non-woven fabric layer, and the non-woven fabric layer comprise plural layers, the barrier portion becomes a barrier for impregnation of the sealing resin to the non-woven fabric layer. However, where the barrier portion is not present as in the above constitution, it is possible to realize a separation membrane that is sufficiently impregnated with the sealing resin at least up to the vicinity of the skin layer.

The separation membrane is preferably that when image data of a face at the skin layer side of the sealing portion are subjected to segmentation treatment at a threshold value of 230, the porous support is impregnated with the polymer until black level of the image data after treatment reaches 60% or more.

When the skin layer is impregnated with the polymer such that the black level after segmentation treatment reaches 60% or more in image data of a face at the skin layer side of the sealing portion, the impregnation property of the sealing resin to the non-woven fabric layer can be made good.

The separation membrane is preferably that the porous support is impregnated with the polymer until haze value of a face at the non-woven fabric layer side of the sealing portion reaches 20% or more.

When the skin layer is impregnated with the polymer such that haze value of a face at the non-woven fabric layer side of the sealing portion reaches 20% or more as above, the impregnation property of the sealing resin to the non-woven fabric layer can be made good. As a result, micro-leaks of raw fluid from the feed-side passage to the permeation-side passage can further be prevented.

The method of manufacturing the spiral reverse osmosis membrane element comprising a cylindrically wound body comprising a perforated core tube and, spirally wound therearound, a separation membrane having a skin layer on a porous support, a feed-side passage material and a permeation-side passage material in a laminated state, and a sealing portion for preventing a feed-side liquid and a permeation-side liquid from being mixed together, according to the present invention comprises film-forming the skin layer on the porous support to form the separation membrane, spirally winding the separation membrane, the feed-side passage material and the permeation-side passage material in a laminated state around the perforated core tube to form a spirally wound body, and applying a sealing resin to edges of the separation membrane facing through the permeation-side passage material from the porous support side so as to prevent the a feed-side liquid and the permeation-side liquid from being mixed together, so that the separation membrane at the edge is impregnated with the sealing resin at least up to the vicinity of the skin layer.

According to the method, it includes a step of applying the sealing resin from the porous support side and impregnating the separation membrane with the sealing resin at least up to the vicinity of the skin layer, thereby sealing the edges of the separation membrane. Therefore, a spiral reverse osmosis membrane element equipped with a separation membrane that effectively prevents micro-leaks of raw fluid from the feed-side passage to the permeation-side passage in the separation membrane is obtained. That is, the method can manufacture a spiral reverse osmosis membrane element that effectively prevents micro-leaks and improves rejection of substances to be separated.

In a preferred embodiment, prior to the formation step of the separation membrane, a step of preparing a solution containing a polyfunctional amino compound having two or more reactive amino groups, and a step of preparing a solution containing a polyfunctional acid halide compound having two or more reactive acid halide groups are conducted, and the formation step of the separation membrane is a step of interfacial polymerizing the polyfunctional amino compound and polyfunctional acid halide compound to form a polyamide layer as the skin layer.

The sealing resin used preferably has a viscosity in a range of 10-40 Pa·s.

By employing the above method, when the sealing resin is applied to the porous support, it is possible to prevent impregnation of the resin into a region other than the coated region due to liquid sag. Further, impregnation property of the sealing resin to the porous support is good, which makes it possible to reach the sealing resin to at least the vicinity of the skin layer. As a result, micro-leaks can effectively be prevented, and a spiral reverse osmosis membrane element having excellent separation performance can be manufactured with good yield.

The present invention exhibits the following effect by the above-described constitution.

The separation membrane is impregnated with the sealing resin at least up to the vicinity of the skin layer, thereby improving the sealing property of the sealing portion. As a result, micro-leaks of raw fluid from the feed-side passage to the permeation-side passage can effectively be prevented, and rejection of substances to be separated can be improved, thereby making the separation performance be good.

In the drawings:
1 separation membrane
2 feed-side passage material
3 permeation-side passage material
4 adhesive
5 core tube
6 adhesive
11 both edge-sealing portion
12 peripheral side-sealing portion
R cylindrically wound body
U separation membrane unit

DETAILED DESCRIPTION OF THE INVENTION

The embodiment of the present invention is described below by referring to the drawings.

Figure 1A:
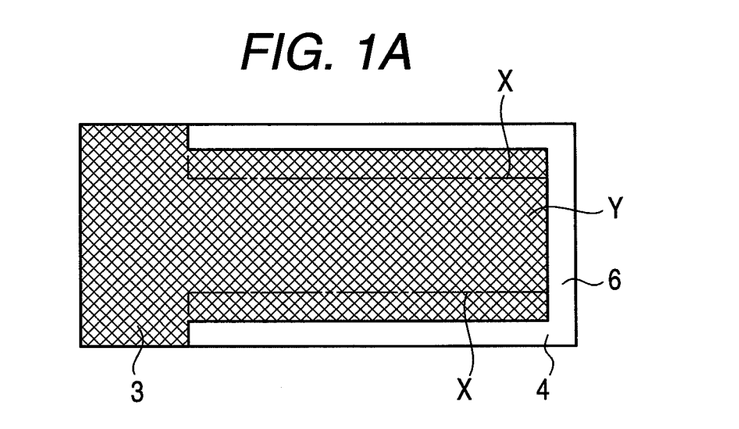
FIGS. 1A-1C are a flow sheet showing one embodiment of the method of manufacturing the spiral reverse osmosis membrane element of the present invention.
Figure 1B:
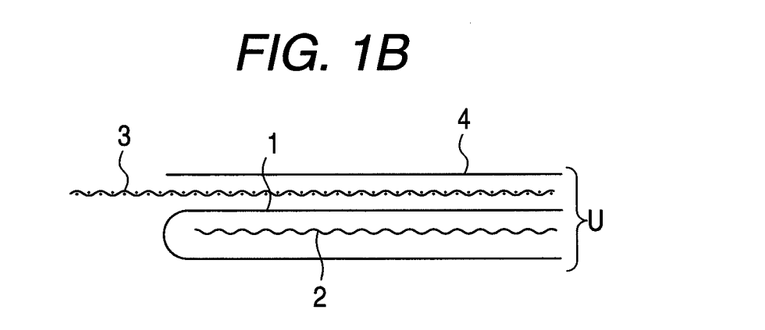
Figure 1C:
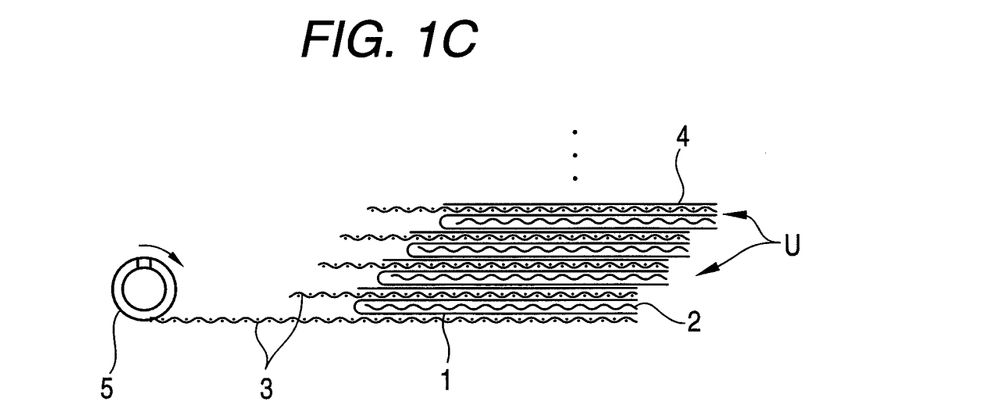
Figure 2:
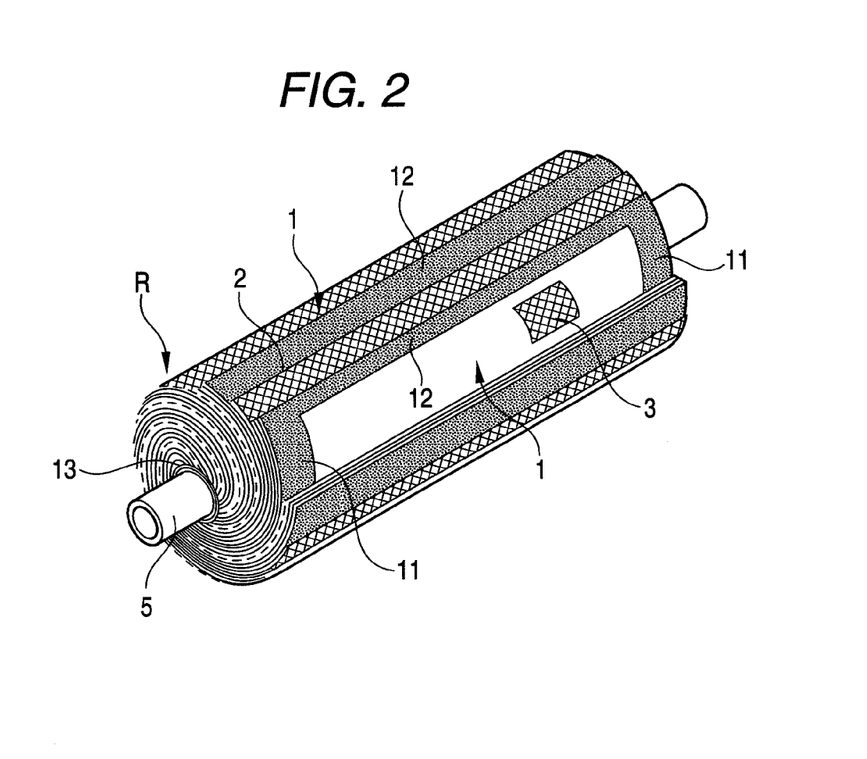
FIG. 2 is a partially broken perspective view showing one embodiment of the spiral reverse osmosis membrane element of the present invention.

FIGS. 1A-1C are a flow sheet showing one embodiment of the method of manufacturing the spiral reverse osmosis membrane element of the present invention. FIG. 2 is a partially broken perspective view showing one embodiment of the spiral reverse osmosis membrane element of the present invention. Portions unnecessary to explain are omitted, and there are portions that are enlarged or contracted in order to facilitate the explanation. Those are the same in the following explanation of the drawings.

As shown in FIGS. 1 and 2, the spiral reverse osmosis membrane element of the present invention comprises a cylindrically wound body R comprising a separation membrane 1, a feed-side passage material 2 and a permeation-side passage material 3 spirally wound around a perforated core tube 5 in a laminated state, and a sealing portion for preventing a feed-side liquid and a permeation-side liquid from being mixed together. The sealing portion comprises a both edge-sealing portion 11 and a peripheral side-sealing portion 12.

As shown in FIG. 2, both edges of the separation membrane 1 facing through the permeation-side passage material 3 is sealed with the both edge-sealing portion 11, and the feed-side passage material 2 is interposed between a plurality of the both edge-sealing portions 11 arranged spirally. The peripheral side-edge of the separation membrane 1 facing through the permeation-side passage material 3 is sealed with the peripheral side-sealing portion 12 along the axial direction.

The cylindrically wound body R can be produced by a step of spirally wind the separation membrane 1, the feed-side passage material 2 and the permeation-side passage material 3 around the perforated core tube 5 in a laminated state to form the cylindrically wound body R, and a step of forming the sealing portion for preventing the feed-side fluid and the permeation-side fluid from being mixed together. Specifically, the cylindrically wound body R can be produced by, for example, the embodiment shown in FIG. 1. FIG. 1A is a plane view of the separation membrane unit U, FIG. 1B is a front view of the separation membrane unit U, and FIG. 1C is a front view showing the state prior to laminating the separation membrane unit U and winding the same.

As shown in FIG. 1A and FIG. 1B, the separation membrane unit U is prepared by laying the separation membrane 1 folded in two halves with the feed-side passage material 2 sandwiched therebetween, and the permeation-side passage material 3, and applying adhesives 4 and 6 for forming the sealing portions 11 and 12 preventing the feed-side fluid and the permeation-side fluid from being mixed together to both edges in an axial direction of the permeation-side passage material 3 and the winding-end edge. In this case, a protective tape may be adhered to the folded portion of the separation membrane 1.

The separation membrane 1 has a structure that the porous support and the skin layer (dense layer) are successively laminated on the non-woven fabric layer. Material of the non-woven fabric layer is not particularly limited, and can use the conventional materials. Examples of the material include polyesters and polyolefins. The non-woven fabric layer preferably comprises a monolayer. However, non-woven fabric layer comprising multilayers is also applicable in the present invention. In this case, the surface of each layer does not preferably undergo heat or pressure by, for example, calendar roll. If the surface is heat-processed, a heat-molten surface layer portion converts into a dense layer, thereby forming a barrier inhibiting impregnation of the sealing resin.

The non-woven fabric layer has an average pore diameter of preferably 8-12 μm, more preferably 9-10 μm. When the average pore diameter is within the above range, it is possible to impregnate the separation membrane with the sealing resin at least up to the vicinity of the skin layer. Where the average pore diameter is smaller than 8 μm, there is the tendency that the sealing resin is in an adhered and wet state, making it difficult to impregnate into the non-woven fabric layer. On the other hand, where the average pore diameter is larger than 12 μm, there is the tendency that a capillary action effect in impregnating the sealing resin into the non-woven fabric layer decreases, thereby making impregnation of the sealing resin insufficient.

The non-woven fabric layer has a ratio of the maximum pore diameter to the average pore diameter (maximum pore diameter/average pore diameter) of preferably 1:1 to 4:1, preferably 1:1 to 3:1. When the maximum pore diameter/average pore diameter is within the above range, the impregnation property of the sealing resin on the face of the non-woven fabric layer can be made uniform, thereby reducing occurrence of unevenness.

Thickness of the non-woven fabric layer (total thickness in the case of plural layers) in not particularly limited. The thickness is preferably 80-120 μm, more preferably 90-110 μm. When the thickness is within the above range, impregnation resistance of the sealing resin can be made optimum. Where the thickness of the non-woven fabric layer is smaller than 80 μm, practical strength may not be obtained. On the other hand, where the thickness is larger than 120 μm, practically sufficient membrane area may not be maintained in the element.

The porous support is microporous, and supports a skin layer. Further, conventional materials can be used as a material constituting the porous support. Specifically, examples of the material include polysulfones, polyaryl sulfones (such as polyether sulfone), polymides and polyvinylidene fluoride. A porous layer comprising polysulfones or polyaryl sulfones is preferable from the standpoint of chemical, mechanical and thermal stabilities.

The porous support has a thickness of preferably 30-60 μm, more preferably 30-40 μm. Where the thickness of porous support is smaller than 30 μm, reduction in defects of the porous support is not realized, and on the other hand, where the thickness is larger than 60 μm, impregnation property of the sealing resin tends to deteriorate.

The non-woven fabric layer at the side contacting the porous support is preferably impregnated with the polymer constituting the porous support. By this impregnation, when the sealing resin contacts the polymer in the course of impregnating the non-woven fabric layer with the sealing resin, impregnation of the sealing resin can be promoted by coagulation. Content of the polymer is preferably 3-6 g/m$^2$. Where the content of the polymer is smaller than 3 g/m$^2$, there is the disadvantage that impregnation of the sealing resin is not promoted. On the other hand, where the content is larger than 6 g/m$^2$, there is the disadvantage that many defects easily occur in the film formation.

The degree of impregnation of the polymer can be evaluated by the method described below.

The degree of impregnation is that when image data of a face at the side of the skin layer 1a are subjected to segmentation treatment, black level of the image data after treatment is preferably 60% or higher. The black level portion shows the state that the portion is impregnated with the polymer. When the black level is 60% or higher, the micro-leaks can sufficiently be prevented. The segmentation treatment is conducted such that image data at the side of the skin layer 1a are retrieved by a scanner, and threshold value is set to 230. Where the image data contain color image data, the data are gradation converted into gray scale and then subjected to segmentation treatment. Examples of the segmentation treatment include dither method and error-diffusion method, in addition to the above method.

Impregnation of the polymer is preferably conducted to an extent such that haze value on the face at the side of the skin layer 1a is 20% or higher. The haze value having 20% or higher shows that the polymer sufficiently impregnates into the non-woven fabric, resulting in good impregnation property of the sealing resin. The haze value used herein is a value measured according to JIS K7136. Specifically, a tape (No. 31B, a product of Nitto Denko Corporation) is adhered to a face of a non-woven fabric layer side, the tape is peeled, and light transmission of the peeled tape is measured with a haze meter.

Figure 3:
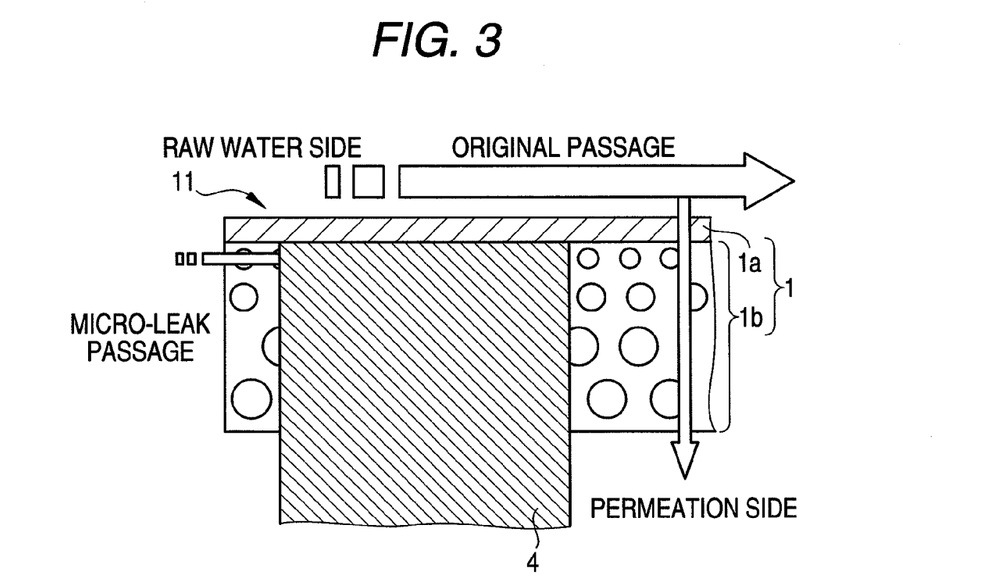
FIG. 3 is an explanatory view showing a flowing state of each portion in the spiral reverse osmosis membrane element of the present invention.

It is sufficient that the sealing resin 4, 6 constituting the sealing portion impregnates uniformly at least up to the vicinity of the skin layer 1a as shown in, for example, FIG. 3. Where the sealing resin does not impregnate up to the vicinity of the skin layer 1a or the sealing resin impregnates partially but not uniformly, micro-leaks occur, and separation performance as a spiral reverse osmosis membrane element decreases.

The sealing resin 4, 6 is not particularly limited, and can use conventional resins. Examples of the sealing resin that can be used include urethane resins, epoxy resins, and hot-melt adhesives. Thus, any conventional adhesives can be used.

The skin layer 1a has a separation performance that does not show permeability to substances to be separated contained in a fluid. The material constituting the skin layer 1a is not particularly limited, and conventional materials can be used. Examples of the material include polyethylene, polypropylene, polyethylene terephthalate, nylon, polyamide, polyacrylonitrile, polyvinyl alcohol, polymethyl methacrylate, polysulfone, polyether sulfone, polyimide, and ethylene-vinyl alcohol copolymers.

The skin layer 1a has a thickness of preferably 0.05-2 μm, more preferably 0.1-1 μm. Examples of the feed-side passage material 2 that can be used include a net material, a mesh material, a grooved sheet and a wave sheet. Examples of the permeation-side passage material 3 that can be used include a net material, a fabric material, a mesh material, a grooved sheet and a wave sheet. The perforated core tube 5 is not particularly limited so long as it has openings around the tube, and the conventional tubes can be used.

The method of manufacturing the spiral reverse osmosis membrane element of the present invention is described by referring to a reverse osmosis membrane element having a polyamide skin layer as the skin layer 1a.

A film-forming solution (aqueous solution) A containing a polyfunctional amino compound having at least two reactive amino groups is prepared.

The polyfunctional amino compound having at least two reactive amino groups is not particularly limited, and examples thereof include aromatic, aliphatic or alicyclic polyfunctional amines. The polyfunctional amines can be used alone or as mixtures of two or more thereof.

Examples of the aromatic polyfunctional amines include m-phenylene diamine, p-phenylene diamine, 1,3,5-triaminobenzene, 1,2,4-triaminobenzene, 3,5-diaminobenzoic acid, 2,4-diaminotoluene, 2,6-diaminotoluene, 2,4-diaminoanisole, amidole and xylylene diamine.

Examples of the aliphatic polyfunctional amines include ethylenediamine, propylenediamine and tris(2-aminomethyl)amine.

Examples of the alicyclic polyfunctional amines include 1,3-diaminocyclohexane, 1,2-diaminocyclohexane, 1,4-diaminocyclohexane, piperazine, 2,5-dimethylpiperazine and 4-aminomethylpiperazine.

A solvent used in the film-forming solution A can be any polar solvent so long as it well dissolves the polyfunctional amino compound, and does not dissolve the porous support used. Such a polar solvent is, for example, water.

The aqueous solution A containing the polyfunctional amine can contain a polymer such as polyvinyl alcohol, polyvinyl pyrrolidone or polyacrylic acid, or a polyhydric alcohol such as sorbitol or glycerine, in water in order to facilitate the film formation or improve performances of a composite reverse osmosis membrane obtained.

Further, salts of tetraalkylammonium halide or trialkylammonium and an organic acid, as disclosed in JP-A-2-187135 can also preferably be used for, for example, facilitating film-formation, improving absorption property of an amine aqueous solution in a micorporous support, and promoting condensation reaction.

Surfactants such as sodium dodecylbenzene sulfonate or sodium dodecylsulfate (sodium laurylsulfate) can also be contained in the aqueous solution A. Those surfactants have the effect to improve wettability of the amine aqueous solution to the microporous support.

To promote condensation reaction at the interface, it is advantageous to use sodium hydroxide or sodium phosphate (Na$_3$PO$_4$), that can remove hydrogen halide formed in an interfacial reaction, or contain an acylation catalyst or the like as a catalyst in the aqueous solution A.

To increase permeation flux, the compound having a solubility parameter of 8-14 (cal/cm$^3$)$^{1/2}$ described in JP-A-8-224452 can be added to the aqueous solution A.

The concentration of the polyfunctional amino compound contained in the film-forming solution A is not particularly limited, but is generally 0.1-10% by weight, preferably 0.5-5% by weight.

Apart from the preparation of the film-forming solution A, a film-forming solution B containing a polyfunctional acid halide compound having at least two reactive acid halide groups is prepared.

The polyfunctional acid halide compound is not particularly limited, and examples thereof include aromatic, aliphatic and alicyclic polyfunctional acid halides. Of those, aromatic polyfunctional acid halides are preferably used. Those polyfunctional acid halide compounds can be used alone or as mixtures of two or more thereof.

Examples of the aromatic polyfunctional acid halides include trimesic chloride, terephthalic chloride, isophthalic chloride, biphenyldicarboxylic chloride, naphthalenedicarboxylic chloride, benzenetrisulfonic chloride, benzenedisulfonic chloride, and chlorosulfonylbenzenedicarboxylic chloride. Of those, monocyclic aromatic compounds are preferably used.

Examples of the aliphatic polyfunctional acid halides include propanetircarboxylic chloride, butanetricarboxylic chloride, pentanetricarboxylic chloride, glutaric halide and adipoilic halide.

Examples of the alicyclic polyfunctional acid halides include cyclopropanetircarboxylic chloride, cyclobutanetetracarboxylic chloride, cyclopentanetircarboxylic chloride, cyclopentanetetracarboxylic chloride, cyclohexanetircarboxylic chloride, tetrahydrofurantetracarbocylic chloride, cyclopentanedicarboxylic chloride, cyclobutanedicarboxylic acid, and cyclohexanedicarboxylic chloride, tetrahydrofurandicarboxylic chloride.

Any solvent can be used for the film-forming solution B so long as it well dissolves the polyfunctional acid halides and is not miscible with the polar solvent used. For example, aliphatic and alicyclic hydrocarbons having 5-10 carbon atoms are used, and examples thereof include pentane, hexane, heptane, octane and cyclopentane.

Concentration of the polyfunctional acid halide compounds in the film-forming solution B is not particularly limited, but is generally 0.01-5% by weight, preferably 0.05-1% by weight.

A skin layer is formed on the porous support. Specifically, the film-forming solution A containing the polyfunctional amine component is applied by, for example, coating on the porous support, and excess aqueous solution is removed to form a first layer. The film-forming solution B containing the polyfunctional acid halide compounds is applied by, for example, coating on the first layer, and excess aqueous solution is removed to form a second layer. In this case, the polyfunctional amino compound and the polyfunctional acid halide compounds are subjected to interfacial polymerization at the interface generated by contact. The layers are dried at a temperature of generally about 20-180° C., preferably about 50-150° C., more preferably about 80-130° C., for about 1-10 minutes, preferably about 2-8 minutes, to form a polyamide skin layer (skin layer) composed of a crosslinked polyamide on the porous support.

The separation membrane, the feed-side passage material and the permeation-side passage material are spirally wound around the perforated core tube in a laminated state to form the cylindrically wound body.

To prevent the feed-side liquid and the permeation-side liquid from being mixed together, the sealing resin is applied to the edges of the separation membrane facing through the permeation-side passage material from the porous support side to impregnate the sealing resin at least up to the vicinity of the skin layer, thereby sealing the edges. The coating method is not particularly limited, and any conventional method can be employed. The amount of the sealing resin applied is appropriately determined according to the area of a region to be sealed, and thickness of the porous support. For example, the coating amount in a range of 0.2-1 g/cm$^2$ is preferable. When the coating amount is within the range, the thickness of the sealing portion only can be prevented from being large as compared with the thickness of other portion, thereby suppressing generation of ununiformity or wrinkles.

Viscosity of the sealing resin in impregnation is preferably within a range of 10-40 Pa·s (measured at 20 revolutions with No. 6 rotor, BH type viscometer manufactured by Toki Sangyo K. K.). When the sealing resin having such a viscosity is applied to the porous support, it can prevent that sealing resin impregnates into a region other than the coated region due to sag. In addition, impregnation property of the sealing resin into the porous support is improved, and this enables the sealing resin to reach at least up to the vicinity of the skin layer. Sag property of the sealing resin is preferably 0-60 mm, more preferably 0-50 mm. Where the sag property is within the above range, when the sealing resin is applied to the porous support, impregnation of the sealing resin at a region other than the coated region due to sag can be prevented. The sag property means a dripped distance when 1.5 g of the sealing resin is heaped on a support after 3 minutes from stirring, and the support is vertically placed.

The spiral reverse osmosis membrane element according to the embodiment of the present invention can be obtained in the above-described manner. The manufacturing method of the present invention makes it unnecessary to use a specific sealing resin by using the porous support having excellent impregnation property of the sealing resin. As a result, the spiral reverse osmosis membrane element can be manufactured, that effectively prevents micro-leaks while suppressing increase in cost, and has excellent separation performance.

When separation operation is conducted using, for example, NaCl aqueous solution as a feed-side fluid, the spiral reverse osmosis membrane element of the present invention shows the following separation performances. NaCl aqueous solution having a concentration of 32,000 ppm is supplied to a separation membrane under operating pressure of 5.5 MPa. In this operation, recovery of a permeate water in the vicinity of a sealing portion is set to be within a range of 8-12%. In this case, electroconductivity of the permeated water in the vicinity of the sealing portion can be 2 times or less the electroconductivity of the permeated water at other region. This shows that the separation membrane of the present invention exhibits extremely excellent salt rejection. In other words, NaCl is sufficiently separated, and the permeated water having extremely high purity is obtained.

Therefore, the spiral reverse osmosis membrane element of the present invention can suitably be used in formation of fresh water by desalination of brine water or seawater, production of ultrapure water, and the like. The spiral reverse osmosis membrane element of the present invention can also be used in the case of removing and recovering contamination sources or effective substances from industrial waste water that is the cause of public pollution, such as dyed waste water or electrodeposition paint waste water, thus contributing to closed system of waste water. Besides, the spiral reverse osmosis membrane element of the present invention can also be used in condensation of effective components, or water treatment such as removal of harmful components in water and sewage. The term "vicinity of the sealing portion" used herein means region X in FIG. 1A. The region X is that a distance apart from the sealing portion is within a range of 0-50 mm. The "region other than the region X" means region Y shown in FIG. 1A.

In the above description, the present invention is described with respect to the most suitable embodiment. However, the present invention is not limited to such an embodiment, and various modifications can be made within a substantially same scope of the technical concept of the present invention.

Specifically, the above embodiment has been explained by referring to the embodiment that the separation membrane 1 is folded so as to sandwich the feed-side passage material 2, the permeation-side passage material 3 is laminated on the separation membrane 1, and the adhesives 4, 6 are applied thereto. However, in the present invention, the folded separation membrane 1 is laminated on the permeation-side passage material 3, and the adhesives 4, 6 can be applied thereto. Further, the feed-side passage material 2 may be sandwiched using two separation membranes 1 in place of the folded separation membrane 1, and the sealing portion may be provided at the wind-starting side. Furthermore, the peripheral sealing portion 12 may not be used by using a continuous separation membrane 1.

The above embodiment shows the example that the spiral membrane element equipped with a plurality of membrane leaves is manufactured using a plurality of the separation membrane unit U as shown in FIG. 1. However, the spiral membrane element equipped with one membrane leaf may be manufactured using a pair of the separation membrane unit U.

The present invention is described in more detail by reference to the following preferable examples, but it should be understood that the invention is not construed as being limited thereto.

EXAMPLE 1

18.3 parts by weight of polysulfone were dissolved in 81.7 parts by weight of dimethylformamide to prepare a film-forming solution. The film-forming solution was cast on a single layer structure non-woven fabric layer having a ratio of a maximum pore diameter to an average pore diameter of 2.9:1. Thus, a polysulfone ultrafiltration membrane having a polysulfone layer (porous support) formed on the non-woven fabric layer was obtained. The polysulfone layer had a thickness of 30 μm. Impregnation amount of the polysulfone to the non-woven fabric layer was 4.2 g/cm$^2$.

3.0 parts by weight of m-phenylenediamine and 0.15 part by weight of sodium lauryl sulfate were dissolved in water to prepare a film-forming solution A. 0.12 part by weight of trimesic chloride was dissolved in an isooctane solution to prepare a film-forming solution B.

The film-forming solution A was applied to the polysulfone layer side of the microporous support, and excess solution was removed to form a coating layer A. The film-forming solution B was applied to the coating layer A, and excess solution was removed to form a coating layer B. Interfacial polymerization was conducted at the interface between the coating layer A and the coating layer B to form a polyamide skin layer (skin layer) on the polysulfone layer. Thus, a composite reverse osmosis membrane was manufactured.

The composite reverse osmosis membrane was wound around a core tube while sealing using a polyurethane (sealing resin) having a viscosity of 20 Pa·s and a sag property of 25 mm. Thus, a spiral reverse osmosis membrane element according to the present invention was obtained.

Figure 4:
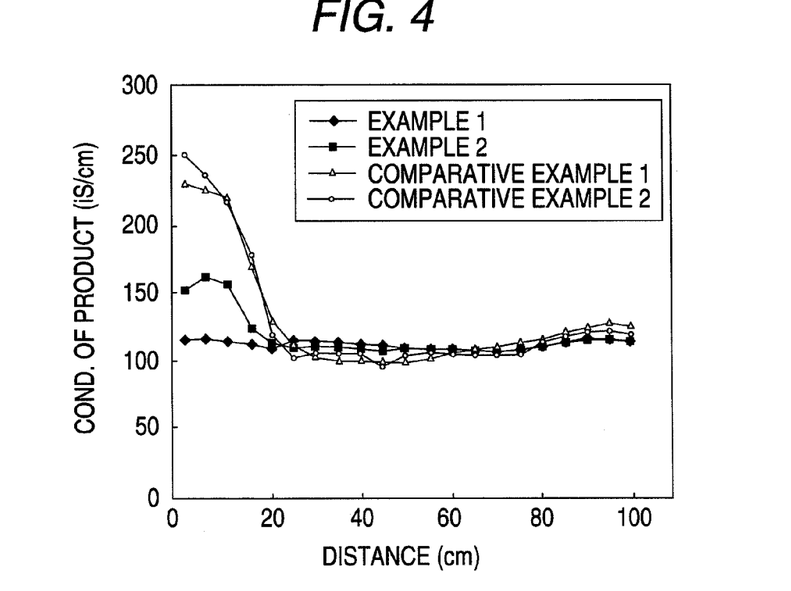
FIG. 4 is a graph showing the relationship between electroconductivity of permeate water and distance in the spiral reverse osmosis membrane element of the present invention.

Separation of NaCl aqueous solution having NaCl concentration of 32,000 ppm was conducted with the spiral reverse osmosis membrane element. Operation conditions were that operating pressure is 5.5 MPa, and recovery was 10%. In the element inside, electroconductivity of permeated water was measured at every predetermined distance from the sealing portion. The results obtained are shown in FIG. 4 that is a graph showing the relationship between the electroconductivity and the distance from the sealing portion.

Image data on the face at the side of the skin layer of the sealing portion were subjected to segmentation treatment using a threshold value of 230, and black level of the image data after treatment was measured. As a result, it was found to be 99.5%.

Haze value on the face at the non-woven fabric layer side of the sealing portion was measured according to JIS K7136. Specifically, a tape (No. 31B, a product of Nitto Denko Corporation) was adhered to the face of the non-woven fabric layer side, the tape was peeled, and light transmission of the peeled tape was measured with a haze meter. As a result, the haze value was 40%.

EXAMPLE 2

A composite reverse osmosis membrane was obtained in the same manner as in Example 1, except for using a non-woven fabric having an average pore diameter of 10.2 μm and having a two-layer structure in which those layers are fused at a paper-making step and therefore a barrier layer becoming resistance is not present between the layers. The composite reverse osmosis membrane was wound around a core tube while sealing using a polyurethane (sealing resin) having a viscosity of 25 Pa·s and a sag property of 35 mm. Thus, a spiral reverse osmosis membrane element according to the present invention was obtained.

Separation of NaCl aqueous solution was conducted in the same manner as in Example 1. The results obtained are shown in FIG. 4 that is a graph showing the relationship between the electroconductivity and the distance.

Black level of the image data on the face at the skin layer side of the sealing portion was measured in the same manner as in Example 1. As a result, it was found to be 90.5%.

Further, haze value on the face at the non-woven fabric layer side of the sealing portion was measured in the same manner as in Example 1. As a result, it was found to be 30%.

COMPARATIVE EXAMPLE 1

A composite reverse osmosis membrane was obtained in the same manner as in Example 1, except for using a heat-welded two-layer structure non-woven fabric having an average pore diameter of 10.2 μm and a ratio of the maximum pore diameter to the average pore diameter of 5.3:1. The composite reverse osmosis membrane was wound around a core tube while sealing using a polyurethane (sealing resin) having a viscosity of 22 Pa·s and a sag property of 35 mm. Thus, a comparative spiral reverse osmosis membrane element was obtained.

Separation of NaCl aqueous solution was conducted in the same manner as in Example 1. The results obtained are shown in FIG. 4 that is a graph showing the relationship between the electroconductivity and the distance.

Black level of the image data on the face at the skin layer side of the sealing portion was measured in the same manner as in Example 1. As a result, it was found to be 3.0%.

Further, haze value on the face at the non-woven fabric layer side of the sealing portion was measured in the same manner as in Example 1. As a result, it was found to be 5%.

COMPARATIVE EXAMPLE 2

A composite reverse osmosis membrane was obtained in the same manner as in Example 1, except for using a single-layer structure non-woven fabric having an average pore diameter of 9.4 μm and a ratio of the maximum pore diameter to the average pore diameter of 2.9:1. The composite reverse osmosis membrane was wound around a core tube while sealing using a polyurethane (sealing resin) having a viscosity of 45 Pa·s and a sag property of 80 mm. Thus, a comparative spiral reverse osmosis membrane element was obtained.

Separation of NaCl aqueous solution was conducted in the same manner as in Example 1. The results obtained are shown in FIG. 4 that is a graph showing the relationship between the electroconductivity and the distance.

Black level of the image data on the face at the skin layer side of the sealing portion was measured in the same manner as in Example 1. As a result, it was found to be 20%.

Further, haze value on the face at the non-woven fabric layer side of the sealing portion was measured in the same manner as in Example 1. As a result, it was found to be 35%.

As is apparent from the graph of FIG. 4, in the spiral reverse osmosis membrane elements of Examples 1 and 2, electroconductivity of permeated water in the vicinity of the sealing portion (distance from the sealing portion is within a range of 0-5 cm) is 2 times or less that of permeated water in the inside (distance from the sealing portion is within a range of 5-90 cm), thus showing good salt rejection. On the other hand, in the spiral reverse osmosis membrane elements of Comparative Examples 1 and 2, electroconductivity of permeated water in the vicinity of the sealing portion exceeds 2 times that of permeated water in the inside, thus showing that salt rejection is high and as a result, separation performance is poor.

It should further be apparent to those skilled in the art that various changes in form and detail of the invention as shown and described above may be made. It is intended that such changes be included within the spirit and scope of the claims appended hereto.

This application is based on Japanese Patent Application No. 2004-255779 filed Sep. 2, 2004, the disclosure of which is incorporated herein by reference in its entirety.

What is claimed is:

1. A method of manufacturing a spiral reverse osmosis membrane element comprising a cylindrically wound body comprising a perforated core tube and, spirally wound therearound, a separation membrane having a skin layer on a porous support, a feed-side passage material and a permeation-side passage material in a laminated state, and a sealing portion for preventing a feed-side liquid and a permeation-side liquid from being mixed together, the method comprising film-forming the skin layer on the porous support to form the separation membrane,
spirally winding the separation membrane, the feed-side passage material and the permeation-side passage material in a laminated state around the perforated core tube to form a spirally wound body, and
applying a sealing resin to edges of the separation membrane facing through the permeation-side passage material from the porous support side so as to prevent the a feed-side liquid and the permeation-side liquid from being mixed together, so that the separation membrane at the edge is impregnated with the sealing resin at least up to the vicinity of the skin layer,
wherein the sealing resin is a polyurethane sealing resin having a viscosity of 20-40 Pa·s in impregnation.

2. The method of manufacturing a spiral reverse osmosis membrane element as claimed in claim 1, further comprising, prior to the formation step of the separation membrane, a step of preparing a solution containing a polyfunctional amino compound having two or more reactive amino groups, and a step of preparing a solution containing a polyfunctional acid halide compound having two or more reactive acid halide groups are conducted, wherein the formation step of the separation membrane is a step of interfacial polymerizing the polyfunctional amino compound and polyfunctional acid halide compound to form a polyamide layer as the skin layer.

3. The method of manufacturing a spiral reverse osmosis membrane element as claimed in claim 1, wherein the sealing resin has a sag property of 0-60 mm.

4. The method of manufacturing a spiral reverse osmosis membrane element as claimed in claim 1, wherein a coating amount of the sealing resin is within a range of 0.2-1.0 g/cm$^2$.

5. The method of manufacturing a spiral reverse osmosis membrane element as claimed in claim 1,
wherein the separation membrane has a structure in which the porous support and the skin layer are successively laminated on a non-woven fabric layer,
wherein the non-woven fabric layer has an average pore diameter of 8-12 μm, and
wherein the non-woven fabric layer is configured without forming a barrier inhibiting the impregnation of the sealing resin.

* * * * *